United States Patent
Chang et al.

(10) Patent No.: US 11,593,091 B2
(45) Date of Patent: Feb. 28, 2023

(54) METHOD AND APPARATUS FOR UPGRADING FIRMWARE OF TRANSFER DEVICE ON MOBILE CARRIER, AND NON-TRANSITORY STORAGE MEDIUM

(71) Applicant: Beijing xiaoma zhixing technology co.LTD, Beijing (CN)

(72) Inventors: Shilei Chang, Beijing (CN); Bin Han, Beijing (CN); Lintao Li, Beijing (CN); Chunlong Zhang, Beijing (CN); Yufan Heng, Beijing (CN); Dong Wang, Beijing (CN)

(73) Assignee: Beijing xiaoma zhixing technology co. LTD, Beijing (CN)

( * ) Notice: Subject to any disclaimer, the term of this patent is extended or adjusted under 35 U.S.C. 154(b) by 0 days.

(21) Appl. No.: 17/226,117

(22) Filed: Apr. 9, 2021

(65) Prior Publication Data

US 2021/0334083 A1    Oct. 28, 2021

(30) Foreign Application Priority Data

Apr. 22, 2020   (CN) .......................... 202010324123.6

(51) Int. Cl.
*G06F 8/65*    (2018.01)
*G06F 8/71*    (2018.01)

(52) U.S. Cl.
CPC ..................... *G06F 8/65* (2013.01)

(58) Field of Classification Search
CPC ..................... G06F 8/65; G06F 8/71
See application file for complete search history.

(56) References Cited

U.S. PATENT DOCUMENTS

| | | | | |
|---|---|---|---|---|
| 2012/0102477 A1* | 4/2012 | Kim | ........................ | G06F 8/654 |
| | | | | 717/169 |
| 2016/0294614 A1* | 10/2016 | Searle | ..................... | H04L 67/34 |
| 2017/0060559 A1* | 3/2017 | Ye | .............................. | G06F 8/65 |
| 2018/0152341 A1* | 5/2018 | Maeda | ............. | H04L 12/40013 |
| 2018/0300472 A1* | 10/2018 | Nakamura | .......... | H04L 63/0853 |
| 2020/0160338 A1* | 5/2020 | Patel | .................. | G06Q 20/3226 |
| 2020/0301695 A1* | 9/2020 | Ogawa | ............. | B60W 30/1886 |

FOREIGN PATENT DOCUMENTS

| | | |
|---|---|---|
| CN | 103469789 A | 12/2013 |
| CN | 103485336 A | 1/2014 |
| CN | 108360972 A | 8/2018 |
| CN | 110106868 A | 8/2019 |

\* cited by examiner

*Primary Examiner* — Chat C Do
*Assistant Examiner* — Noor Alkhateeb
(74) *Attorney, Agent, or Firm* — Gang Yu (57) ABSTRACT

Provided are a method and apparatus for upgrading firmware of a transfer device on a mobile carrier and a non-transitory storage medium. The method includes that: according to present version information of a firmware package of a transfer device and a firmware package version file including update version information, whether the firmware package in the transfer device is able to be upgraded is determined; in a case that it is, determined that the transfer device is able to be upgraded, whether the update version information matches with the present version information is determined; and in a case that the update version information does not match with the present version information, the firmware package in the transfer device is upgraded.

18 Claims, 3 Drawing Sheets

METHOD AND APPARATUS FOR UPGRADING FIRMWARE OF TRANSFER DEVICE ON MOBILE CARRIER, AND NON-TRANSITORY STORAGE MEDIUM

CROSS-REFERENCE TO RELATED APPLICATIONS

The present disclosure claims priority to Chinese Patent Application No. 202010324123.6, submitted to the State Intellectual Property Office (SIPO) on Apr. 22, 2020, the contents of which are hereby incorporated by reference in their entirety.

TECHNICAL FIELD

The disclosure relates to the field of unmanned driving, and more particularly to a method and apparatus for upgrading firmware of a transfer device on a mobile carrier, a non-transitory storage medium and a processor.

BACKGROUND

The Nbox device serves as an important transfer device for sensor data on mobile carriers, and also provides a network port for vehicle-mounted devices. The Nbox device is integrated with high-performance chips, and provided with logic control units like Field Programmable Gate Arrays (FPGAs) and computing units like Central Processing Units (CPUs). As the Nbox device in the existing mobile device cannot be upgraded remotely and it is necessary to manually remove a rectification hood of the mobile carrier, open a cover of the Nbox2.5 device and manually refresh and write a program, both time and labor are consumed, the firmware version may be refreshed falsely and the correctness of the version cannot be ensured.

The above information disclosed in this background section is only for enhancement of understanding on the background of the disclosure. Accordingly, the background includes some information, but the information does not form the conventional art that is already known to a person skilled in the art in the country.

SUMMARY

To achieve the foregoing objective, according to an aspect of the disclosure, a method for upgrading firmware of a transfer device on a mobile carrier is provided, which includes that: according to present version information of a firmware package of the transfer device and a firmware package version file including update version information, whether the firmware package in the transfer device is able to be upgraded is determined, the transfer device is configured to transfer sensor data on the mobile carrier, and the transfer device is further configured to provide a network port for the mobile carrier; in a case that it is determined that the transfer device is able to be upgraded, whether the update version information matches with the present version information is determined; and in a case that the update version information does not match with the present version information, the firmware package in the transfer device is upgraded.

Optionally, the operation that according to the present version information of the firmware package of the transfer device and the firmware package version file including the update version information, whether the firmware package in the transfer device is able to be upgraded is determined includes that: the present version information of the firmware package of the transfer device is acquired; whether the present version information meets a first predetermined condition is determined; in a case that it is determined that the present version information meets the first predetermined condition, the firmware package version file including the update version information is acquired, the update version information is version information of an update firmware package, and the update firmware package is a firmware package to be obtained after updating the firmware package and to be applied in the transfer device; whether the update firmware package and the firmware package version file exist is determined; in a case that the update firmware package and the firmware package version file exist, a serial number of the mobile carrier is acquired, the transfer device is mounted on the mobile carrier; whether the serial number of the mobile carrier meets a second predetermined condition is determined; and in a case that the serial number of the mobile carrier meets the second predetermined condition, it is determined that the transfer device is able to be upgraded.

Optionally, the operation that whether the serial number of the mobile carrier meets the second predetermined condition is determined includes that: whether a database has a serial number same as the serial number of the mobile carrier is determined, the database is at least configured to store a serial number of each mobile carrier; in a case that the database has the serial number same as the serial number of the mobile carrier, it is determined that the serial number of the mobile carrier meets the second predetermined condition; and in a case that the serial number of the mobile carrier is not the same as the serial number in the database, it is determined that the serial number of the mobile carrier does not meet the second predetermined condition.

Optionally, before the firmware package version file including the update version information is acquired, the method further includes that: the update firmware package is acquired, the update firmware package includes updated firmware and a version information file corresponding to the update firmware, and the version information file includes the version information of the update firmware package; the version information of the update firmware package is updated to an initial firmware package version file to obtain an updated firmware package version file, the updated firmware package version file includes firmware package version information corresponding to a plurality of the transfer devices, and the firmware package version information at least includes a firmware version number; and the update firmware package and the updated firmware package version file are stored to a storage device, the storage devices located on the mobile carrier.

Optionally, the storage device of the transfer device includes a guidance system region, a backup system region, an application system region, a version information region, an upgrade successful mark information region and an upgrade failed mark information region, and the operation that the firmware package in the transfer device is upgraded includes that: a guidance system in the guidance system region determines a start-up system for upgrading the firmware package; upgrade of the firmware package is started according to the start-up system; system variables are updated to a corresponding system state of the start-up system; whether each file for upgrading the firmware package exists is determined; in a case that each file exists, a check value of each file is checked; whether each file passes through check is determined according to each check value; and in a case that it is determined that each file passes through the check, upgrade successful mark information in the upgrade successful mark information region is first erased, and then data in the application system region and data in the version information region are erased.

Optionally, after in the case that it is determined that each file passes through the check, the upgrade successful mark information in the upgrade successful mark information region is first erased, and then the data in the application system region and the data in the version information region are erased, the operation that the firmware package in the transfer device is upgraded further includes that: each file is stored to the application system region; each file stored to the application system region is read back, and each file read and each file stored to the application system region are checked; in a case that each file read and each file stored to the application system region pass through check, the version information is stored to the version information region; the version information stored to the version information region is read back, and the version information is checked; and in a case that the version information region pass through check, the upgrade successful mark information in the upgrade successful mark information region is updated.

Optionally, the operation that the guidance system in the guidance system region determines the start-up system for upgrading the firmware package includes that: in a case that the information read by the guidance system is the upgrade successful mark information, the guidance system determines an application system as the start-up system, the application system is provided in the application system region; and in a case that the information read by the guidance system is upgrade failed mark information, the guidance system determines a backup system as the start-up system, the backup system is provided in the backup system region.

Optionally, after the application system is determined as the start-up system, the operation that the system variables are updated to the corresponding system state of the start-up system includes that: the system variables are updated to a system state of the application system.

Optionally, after the backup system is determined as the start-up system, the operation that the system variables are updated to the corresponding system state of the start-up system includes that: the system variables are updated to a system state of the backup system.

Optionally, the backup system region is configured to store a system of a basic version.

Optionally, the application system region is configured to store a system for upgrade.

Optionally, the firmware package further includes CPU firmware, FPGA firmware, and an Application (APP) program, and the version information file includes version information of the CPU firmware, version information of the FPGA firmware and version information of the APP program.

According to another aspect of the disclosure, an apparatus for upgrading firmware of a transfer device on a mobile carrier is provided, which includes: a first determination component, configured to determine, according to present version information of a firmware package of the transfer device and a firmware package version file including update version information, whether the firmware package in the transfer device is able to be upgraded, the transfer devices configured to transfer sensor data on the mobile carrier, and the transfer device is further configured to provide a network port for the mobile carrier; a second determination component, configured to determine, in a case of determining that the transfer device able to be upgraded, whether the update version information matches with the present version information; and an upgrade component, configured to upgrade, in a case that the update version information does not match with the present version information, the firmware package in the transfer device.

According to still some other embodiments of the disclosure, a non-transitory storage medium is provided, which includes a stored program; and the program executes any of the method.

According to still some other embodiments of the disclosure, a processor is provided; the processor is configured to run a program; and the program runs to execute any of the method.

BRIEF DESCRIPTION OF THE DRAWINGS

The drawings of the specification forming a part of the disclosure are intended to provide a further understanding of the disclosure. The schematic embodiments and illustrations of the disclosure are intended to explain the disclosure, and do not form improper limits to the disclosure. In the drawings.

DETAILED DESCRIPTION OF THE EMBODIMENTS

It should be noted that embodiments in the disclosure and characteristics in the embodiments may be combined under the condition of no conflicts. The disclosure will be illustrated below with reference to the drawings and in conjunction with the embodiments in detail.

In order to make those skilled in the art better understand the solutions of the disclosure, the technical solutions in the embodiments of the disclosure will be clearly and completely described below with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of those skilled in the art fall within the scope of protection of the disclosure.

It should be noted that the specification and claims of the disclosure and terms "first", "second" and the like in the drawings are used to distinguish similar objects, and do not need to describe a specific sequence or a precedence order. It will be appreciated that data used in such a way may be exchanged under appropriate conditions, in order that the embodiments of the disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

For the ease of description, a part of nouns or terms in the embodiments of the disclosure are described below.

Firmware: the firmware refers to a program written into an Erasable Programmable Read-Only Memory (EPROM) or an Electrically Erasable Programmable Read-Only Memory (EEPROM), and generally is a program able to be upgraded by a user via a special refreshing program.

As described in the background, the firmware package of the sensor data transfer device in the mobile carrier cannot be remotely upgraded in the conventional art. In order to solve the above problem that the firmware package of the sensor data transfer device in the mobile carrier cannot be remotely upgraded, embodiments of the disclosure provide a method and apparatus for upgrading firmware of a transfer device in a mobile carrier, a non-transitory storage medium and a processor.

According to the embodiments of the disclosure, a method for upgrading firmware of a transfer device on a mobile carrier is provided.

Figure 1:
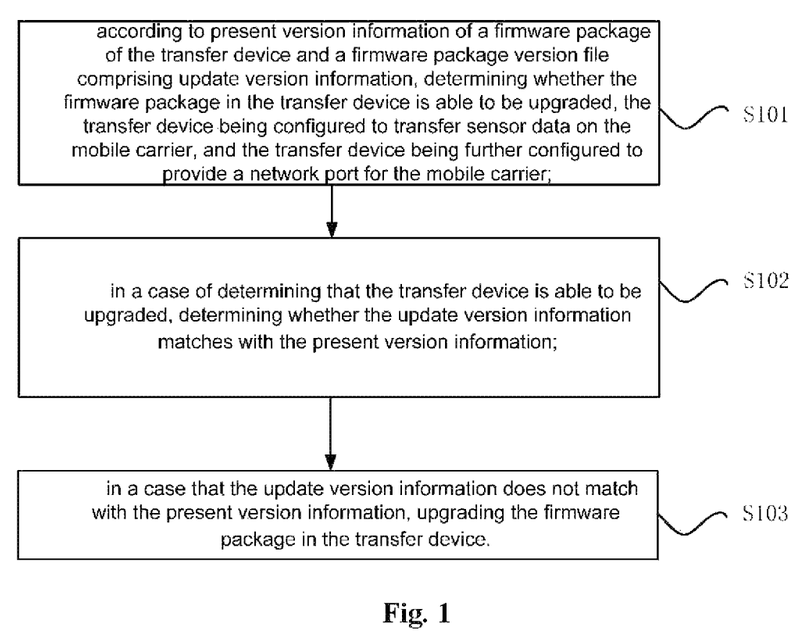
FIG. 1 illustrates a flowchart of a method for upgrading firmware of a transfer device on a mobile carrier according to some embodiments of the disclosure.

FIG. 1 illustrates a flowchart of a method for upgrading firmware of a transfer device on a mobile carrier according to some embodiments of the disclosure. As shown in FIG. 1, the method includes the following steps.

In S101, according to present version information of a firmware package of the transfer device and a firmware package version file including update version information, whether the firmware package in the transfer device is able to be upgraded is determined, the transfer device is configured to transfer sensor data on the mobile carrier, and the transfer device is further configured to provide a network port for the mobile carrier.

In S102, in a case that it is determined that the transfer device is able to be upgraded, whether the update version information matches with the present version information is determined.

In S103, in a case that the update version information does not match with the present version information, the firmware package in the transfer device is upgraded.

In the above solutions, according to the present version information of the firmware package of the transfer device and the firmware package version file including the update version information, whether the firmware package in the transfer device is able to be upgraded is determined; in the case that the transfer device is able to be upgraded, whether the update version information matches with the present version information is determined; and in the case that the update version information does not match with the present version information, the firmware package in the transfer device is upgraded. In the conventional art, as the transfer device cannot be upgraded remotely, and it is necessary to manually remove a rectification hood of the mobile carrier, open a cover of a transfer device case, and manually refresh and write a program, both time and labor are consumed, the firmware version may be refreshed falsely and the accuracy of the version cannot be ensured. The solutions provided by the disclosure can realize remote upgrade of the firmware package of the transfer device in the mobile carrier, thereby greatly reducing the workload and ensuring the accuracy of the version.

It is to be noted that the steps shown in the flowchart of the accompanying drawings may be executed in, for example, a computer system including a set of computer executable instructions. In addition, although a logical sequence is shown in the flowchart, in some cases, the steps shown or described may be performed in an order different from here.

In some embodiments of the disclosure, the operation that according to the present version information of the firmware package of the transfer device and the firmware package version file including the update version information, whether the firmware package in the transfer device is able to be upgraded is determined includes that: the present version information of the firmware package of the transfer device is acquired; whether the present version information meets a first predetermined condition is determined; in a case that it is determined that the present version information meets the first predetermined condition, the firmware package version file including the update version information is acquired, the update version information is version information of an update firmware package, and the update firmware package is a firmware package to be obtained after updating the firmware package and to be applied in the transfer device; whether the update firmware package and the firmware package version file exist is determined; in a case that the update firmware package and the firmware package version file exist, a serial number of the mobile carrier is acquired, the transfer device is mounted on the mobile carrier; whether the serial number of the mobile carrier meets a second predetermined condition is determined; and in a case that the serial number of the mobile carrier meets the second predetermined condition, it is determined that the transfer device is able to be upgraded. In the embodiments, whether the firmware package in the transfer device is able to be upgraded is determined by means of the above steps, such that sufficient early preparation work on whether the firmware package in the transfer device is able to be upgraded is ensured, and the accuracy on upgrade of the firmware package is further ensured.

In actual applications, in some embodiments of the disclosure, the firmware package version file further includes a version information list of firmware packages for supporting the upgrade, i.e., version information of multiple firmware packages that may be upgraded. The above first predetermined condition may be to match with one piece of version information in the version information list, i.e., same as the version information. That is, in the embodiments, determining whether the present version information meets the first predetermined condition is to determine whether the present version information matches with (same as) one piece of version information in the version information list; if both are the same, the present version information meets the first predetermined condition; and if both are not the same, the present version information does not meet the first predetermined condition.

In order to further ensure the accuracy on upgrade of the firmware package, in some embodiments of the disclosure, after whether the present version information meets the first predetermined condition is determined, and before the firmware package version file including the update version information is acquired, the method further includes that: a voice prompt on whether to perform upgrade is sent; in a case of a person on the mobile carrier, a selection on yes or no is made; and in a case of no person on the mobile carrier, the selection on the upgrade is automatically determined when a countdown is timed out.

In some other embodiments of the disclosure, the operation that whether the serial number of the mobile carrier meets the second predetermined condition is determined includes that: whether a database has a serial number same as the serial number of the mobile carrier is determined, the database being at least configured to store a serial number of each mobile carrier; in a case that the database has the serial number same as the serial number of the mobile carrier, it is determined that the serial number of the mobile carrier meets the second predetermined condition; and in a case that the serial number of the mobile carrier is not the same as the serial number in the database, it is determined that the serial number of the mobile carrier does not meet the second predetermined condition. That is, in the case that the database has the serial number same as the serial number of the to-be-upgraded mobile carrier, it is further determined that the firmware package in the transfer device of the mobile carrier is able to be upgraded, thereby further guaranteeing the accuracy on upgrade of the firmware package.

In some other embodiments of the disclosure, before the firmware package version file including the update version information is acquired, the method further includes that: the update firmware package is acquired, the update firmware package including updated firmware and a version information file corresponding to the update firmware, and the version information file includes version information of the update firmware package; the version information of the update firmware package is updated to an initial firmware package version file to obtain an updated firmware package version file, the updated firmware package version file is the firmware package version file which includes the update version information, the updated firmware package version file includes firmware package version information corresponding to a plurality of the transfer devices, and the firmware package version information at least includes a firmware version number; and the update firmware package and the updated firmware package version file are stored to a storage device, the storage device is located on the mobile carrier. That is, before the firmware package in the transfer device of the mobile carrier is upgraded, each version of firmware package and the firmware package version file need to be updated, and the updated firmware package and firmware package version file are stored to the storage device, so as to facilitate the subsequent upgrade of the firmware package in the transfer device, ensure the richness of the firmware package and firmware package version file, and further ensure the accuracy on upgrade of the firmware package.

In still some other embodiments of the disclosure, the storage device of the transfer device includes a guidance system region, a backup system region, an application system region, a version information region, an upgrade successful mark information region and an upgrade failed mark information region, and the operation that the firmware package in the transfer device is upgraded includes that: a guidance system in the guidance system region determines a start-up system for upgrading the firmware package; upgrade of the firmware package is started according to the start-up system; system variables are updated to a corresponding system state of the start-up system; whether each file for upgrading the firmware package exists is determined; in a case that each file exists, a check value of each file is checked; whether each file passes through check is determined according to each check value; and in a case that it is determined that each file passes through the check, upgrade successful mark information in the upgrade successful mark information region is first erased, and then data in the application system region and data in the version information region are erased. Specifically, the check value of each file may be an MD5 check value. The MD5 check value is configured to determine the completeness of each file. The determination on the completeness of the files includes determination on the number of files and names of the files. Specifically, the completeness of each file is determined by generating a 128-bit (16-byte) hashed value; and in a case that the hash values are the same, it is determined that the files are complete, and thus by means of the determination on the completeness, the presence of the files is determined; the upgrade successful mark information may be keywords such as ponyai. Once these keywords are detected by the program in next start-up, it is considered that the previous upgrade is successful, thereby further ensuring the accuracy on upgrade of the firmware package.

In some embodiments of the disclosure, after in the case that it is determined that each file passes through the check, the upgrade successful mark information in the upgrade successful mark information region is first erased, and then the data in the application system region and the data in the version information region are erased, the operation that the firmware package in the transfer device is upgraded further includes that: each file is stored to the application system region; each file stored to the application system region is read back, and each file read and each file stored to the application system region are checked; in a case that each file read and each file stored to the application system region pass through check, the version information is stored to the version information region; the version information stored to the version information region is read back, and the version information is checked; and in a case that the version information region pass through check, the upgrade successful mark information in the upgrade successful mark information region is updated. Each read file and each file stored to the application system region are checked, and the version information stored to the version information region is checked, and the check value of each file may be the MD5 check value; and with multiple times of check, the accuracy on upgrade of the firmware package is further ensured.

In some other embodiments of the disclosure, the operation that the guidance system in the guidance system region determines the start-up system for upgrading the firmware package includes that: in a case that information read by the guidance system is the upgrade successful mark information, the guidance system determines an application system as the start-up system, the application system is located in the application system region; and in a case that information read by the guidance system is upgrade failed mark information, the guidance system determines a backup system as the start-up system, the backup system is located in the backup system region. That is, in the case that information read by the guidance system is the upgrade successful mark information, the upgrade is started from the application system; and in the case that information read by the guidance system is upgrade failed mark information, the upgrade is started from the backup system; and therefore, the accuracy on upgrade of the firmware package is further ensured.

In still some other embodiments of the disclosure, after the application system is determined as the start-up system, the operation that the system variables are updated to the corresponding system state of the start-up system includes that: the system variables are updated to a system state of the application system. By updating the system variables to the system state of the application system, the preparation is made for the subsequent upgrade of the firmware package, thereby further ensuring the accuracy on upgrade of the firmware package.

In some embodiments of the disclosure, after the backup system is determined as the start-up system, the operation that the system variables are updated to the corresponding system state of the start-up system includes that: the system variables are updated to a system state of the backup system. By updating the system variables to the system state of the backup system, the preparation is made for the subsequent upgrade of the firmware package, thereby further ensuring the accuracy on upgrade of the firmware package.

In some other embodiments of the disclosure, the backup system region is configured to store a system of a basic version. The system of the basic version is configured to ensure security work of the upgrade and the mobile carrier, and is generally a stable system subjected to long term test.

In still some other embodiments of the disclosure, the application system region is configured to store a system for upgrade. The application system includes a latest firmware package, and is generally configured for actual use.

Figure 3:
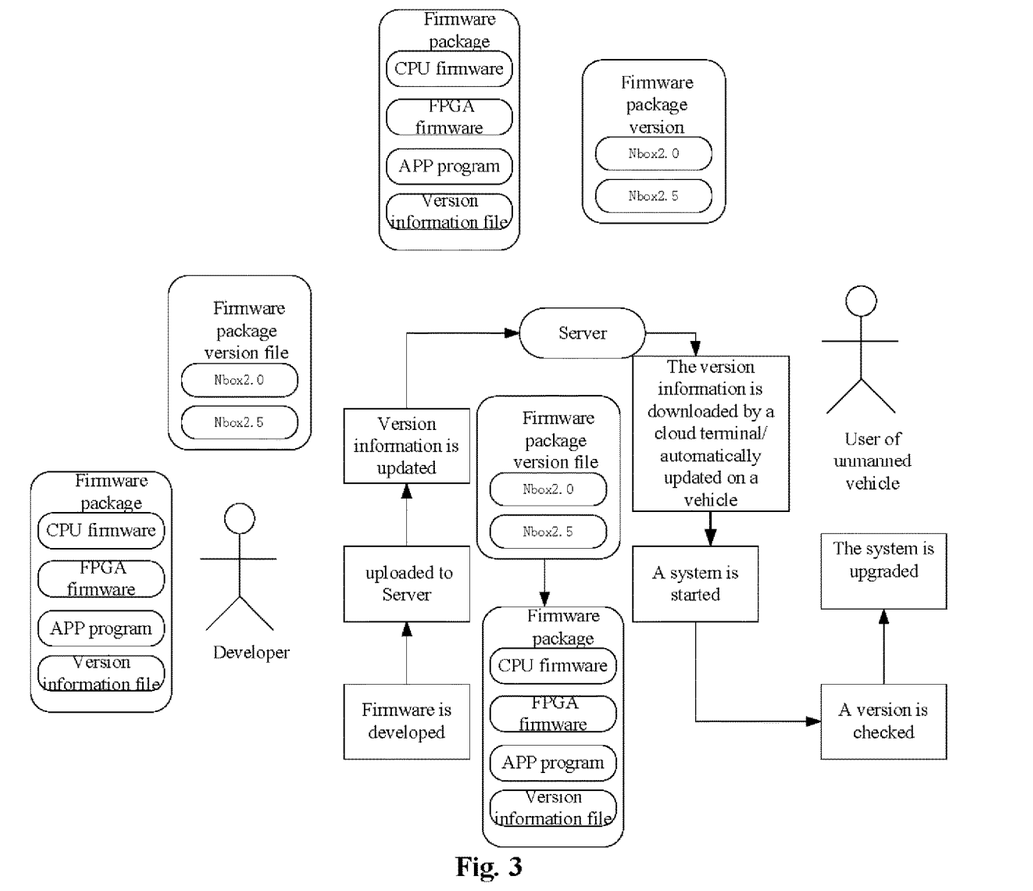
FIG. 3 illustrates an overall flowchart for upgrading firmware of a transfer device on a mobile carrier according to some embodiments of the disclosure.

In some other embodiments of the disclosure, the firmware package further includes CPU firmware, FPGA firmware, and an APP program, and the version information file includes version information of the CPU firmware, version information of the FPGA firmware and version information of the APP program. As shown in FIG. 3, after new functions are developed by the developers, the CPU firmware, the FPGA firmware, the APP program and the version information file storing the firmware are packaged into the firmware package, and the firmware package version is updated to the firmware package version file; the firmware package version file lists version numbers of firmware packages corresponding to transfer devices of hardware versions, such as Nbox2.0 and Nbox2.5; and then, both the firmware package and the firmware package version file are uploaded to a server. In use, the user or the automatic downloading system of the unmanned vehicle downloads each version of the firmware package of the transfer device to the vehicle-mounted storage device according to the firmware package version file; and when the mobile carrier system is started, the version information in the transfer device is compared according to the version information in the firmware package; if both are the same, the system is not upgraded; and if both are different, the system is upgraded. The mobile carrier includes but not limited to the unmanned vehicle.

The embodiments of the disclosure further provide an apparatus for upgrading firmware of a transfer device on a mobile carrier. It is to be noted that the apparatus for upgrading the firmware of the transfer device on the mobile carrier in the embodiments of the disclosure may be configured to execute the method for upgrading the firmware of the transfer device on the mobile carrier in the embodiments of the disclosure. The apparatus for upgrading the firmware of the transfer device on the mobile carrier in the embodiments of the disclosure is described below.

Figure 2:
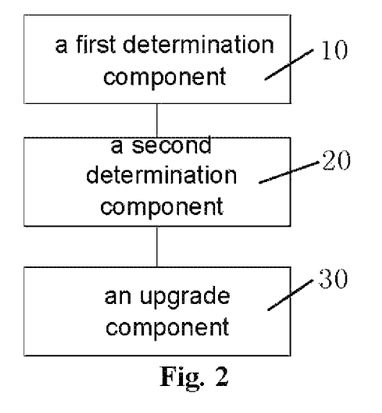
FIG. 2 illustrates a schematic diagram of an apparatus for upgrading firmware of a transfer device on a mobile carrier according to some embodiments of the disclosure.

FIG. 2 illustrates a schematic diagram of an apparatus for upgrading firmware of a transfer device on a mobile carrier according to some embodiments of the disclosure. As shown in FIG. 2, the apparatus includes a first determination component 10, a second determination component 20 and an upgrade component 30.

The first determination unit 10 is configured to determine, according to present version information of a firmware package of the transfer device and a firmware package version file including update version information, whether the firmware package in the transfer device is able to be upgraded, the transfer device is configured to transfer sensor data on the mobile carrier, and the transfer device is further configured to provide a network port for the mobile carrier.

The second determination unit 20 is configured to determine, in a case of determining that the transfer device is able to be upgraded, whether the update version information matches with the present version information.

The upgrade unit 30 is configured to update, in a case that the update version information does not match with the present version information, the firmware package in the transfer device.

In the above solutions, the first determination unit determines, according to the present version information of the firmware package of the transfer device and the firmware package version file including the update version information, whether the firmware package in the transfer device is able to be upgraded; in the case that the transfer device is able to be upgraded, the second determination unit determines whether the update version information matches with the present version information; and in the case that the update version information does not match with the present version information, the upgrade unit upgrades the firmware package in the transfer device. In the conventional art, as the transfer device cannot be upgraded remotely, and it is necessary to manually remove a rectification hood of the mobile carrier, open a cover of a transfer device case, and manually refresh and write a program, both time and labor are consumed, the firmware version may be refreshed falsely and the accuracy of the version cannot be ensured. The solutions provided by the disclosure can realize remote upgrade of the firmware package of the transfer device in the mobile carrier, thereby greatly reducing the workload and ensuring the accuracy of the version.

In some embodiments of the disclosure, the first determination unit includes a first acquisition module, a first determination module, a second acquisition module, a second determination module, a third acquisition module, a third determination module and a fourth determination module. The first acquisition module is configured to acquire the present version information of the firmware package of the transfer device; the first determination module is configured to determine whether the present version information meets a first predetermined condition; the second acquisition module is configured to acquire, in a case of determining that the present version information meets the first predetermined condition, the firmware package version file includes the update version information, the update version information is version information of an update firmware package, and the update firmware package is a firmware package to be obtained after updating the firmware package and to be applied in the transfer device; the second determination module is configured to determine whether the update firmware package and the firmware package version file exist; the third acquisition module is configured to acquire, in a case that the update firmware package and the firmware package version file exist, a serial number of the mobile carrier, the transfer device is mounted on the mobile carrier; the third determination module is configured to determine whether the serial number of the mobile carrier meets a second predetermined condition; and the fourth determination module is configured to determine, in a case that the serial number of the mobile carrier meets the second predetermined condition, that the transfer device is able to be upgraded. In the embodiments, whether the firmware package in the transfer device is able to be upgraded is determined by means of the above module, such that sufficient early preparation work on whether the firmware package in the transfer device is able to be upgraded is ensured, and the accuracy on upgrade of the firmware package is further ensured.

In actual applications, in some embodiments of the disclosure, the firmware package version file further includes a version information list of firmware packages for supporting the upgrade, i.e., version information of multiple firmware packages that may be upgraded. The above first predetermined condition may be to match with one piece of version information in the version information list, i.e., same as the version information. That is, In the embodiments, determining whether the present version information meets the first predetermined condition into determine whether the present version information matches with (same as) one piece of version information in the version information list; if both are the same, the present version information meets the first predetermined condition; and if both are not the same, the present version information does not meet the first predetermined condition.

In order to further ensure the accuracy on upgrade of the firmware package, in some embodiments of the disclosure, after whether the present version information meets the first predetermined condition is determined, and before the firmware package version file including the update version information is acquired, the apparatus further includes a prompt unit; and the prompt unit is configured to send a voice prompt on whether to perform upgrade, make, in a case of a person on the mobile carrier, a selection on yes or no, and automatically determine, in a case of no person on the mobile carrier, the selection on the upgrade when a countdown is timed out.

In some other embodiments of the disclosure, the third determination module includes a first determination sub-module, a second determination sub-module and a third determination sub-module. The first determination sub-module is configured to determine whether a database has a serial number same as the serial number of the mobile carrier, the database is at least configured to store a serial number of each mobile carrier; the second determination sub-module is configured to determine, in a case that the database has the serial number same as the serial number of the mobile carrier, that the serial number of the mobile carrier meets the second predetermined condition; and the third determination sub-module is configured to determine, in a case that the serial number of the mobile carrier is not the same as the serial number in the database, that the serial number of the mobile carrier does not meet the second predetermined condition. That is, in the case that the database has the serial number same as the serial number of the to-be-upgraded mobile carrier, it is further determined that the firmware package in the transfer device of the mobile carrier is able to be upgraded, thereby further guaranteeing the accuracy on upgrade of the firmware package.

In some other embodiments of the disclosure, the apparatus further includes an acquisition unit, an update unit and a storage unit. The acquisition unit is configured to acquire, before the firmware package version file including the update version information is acquired, the update firmware package, the update firmware package including updated firmware and a version information file corresponding to the update firmware, and the version information file includes version information of the update firmware package; the update unit is configured to update version information of the update firmware package to an initial firmware package version file to obtain an updated firmware package version file, the updated firmware package version file is the firmware package version file which includes the update version information, the updated firmware package version file includes firmware package version information corresponding to a plurality of the transfer devices, and the firmware package version information at least includes a firmware version number; and the storage unit is configured to store the update firmware package and the updated firmware package version file to a storage device, the storage device is located on the mobile carrier. That is, before the firmware package in the transfer device of the mobile carrier is upgraded, each version of firmware package and firmware package version file need to be updated, and the updated firmware package and firmware package version file are stored to the storage device, so as to facilitate the subsequent upgrade of the firmware package in the transfer device, ensure the richness of the firmware package and firmware package version file, and further ensure the accuracy on upgrade of the firmware package.

In still some other embodiments of the disclosure, the storage device of the transfer device includes a guidance system region, a backup system region, an application system region, a version information region, an upgrade successful mark information region and an upgrade failed mark information region, and the upgrade unit includes a fourth determination module, a start-up module, a first update module, a fifth determination module, a first check module, a sixth determination module and an erasure module. The fourth determination module is configured for a guidance system in the guidance system region to determine a start-up system for upgrading the firmware package; the start-up module is configured to start upgrade of the firmware package according to the start-up system; the first update module is configured to update system variables to a corresponding system state of the start-up system; the fifth determination module is configured to determine whether each file for upgrading the firmware package exists; the first check module is configured to check, in a case that each file exists, a check value of each file; the sixth determination module is configured to determine whether each file passes through check according to each check value; and the erasure module is configured to first erase, in a case of determining that each file passes through the check, upgrade successful mark information in the upgrade successful mark information region, and then erase data in the application system region and data in the version information region. Specifically, the check value of each file may be an MD5 check value. The MD5 check value is configured to determine the completeness of each file. The determination on the completeness of the files includes determination on the number of files and names of the files. Specifically, the completeness of each file is determined by generating a 128-bit (16-byte) hashed value; and in a case that the hash values are the same, it is determined that the files are complete, and thus by means of the determination on the completeness, the presence of the files is determined; the upgrade successful mark information may be keywords such as ponyai. Once these keywords are detected by the program in next start-up, it is considered that the previous upgrade is successful, thereby further ensuring the accuracy on upgrade of the firmware package.

In some embodiments of the disclosure, the upgrade unit further includes a first storage module, a second check module, a second storage module, a third check module and a second update module. The first storage module is configured to store, after in the case that each file passes through the check, the upgrade successful mark information in the upgrade successful mark information region is first erased, and then the data in the application system region and the data in the version information region are erased, each file to the application system region; the second check module is configured to read back each file stored to the application system region, and check each file read and each file stored to the application system region; the second storage module is configured to store, in a case that each file read and each file stored to the application system region pass through check, the version information to the version information region; the third check module is configured to read back the version information stored to the version information region, and check the version information; and the second update module is configured to update, in a case that the version information region pass through check, the upgrade successful mark information in the upgrade successful mark information region. Each read file and each file stored to the application system region are checked, and the version information stored to the version information region is checked, and the check value of each file may be the MD5 check value; and with multiple times of check, the accuracy on upgrade of the firmware package is further ensured.

In some other embodiments of the disclosure, the fourth determination module includes a fourth determination sub-module and a fifth determination sub-module. The fourth determination sub-module is configured to enable, in a case that information read by the guidance system is the upgrade successful mark information, the guidance system to determine an application system as the start-up system, the application system is located in the application system region; and the fifth determination sub-module is configured to enable, in a case that information read by the guidance system is upgrade failed mark information, the guidance system to determine a backup system as the start-up system, the backup system is located in the backup system region. That is, in the case that information read by the guidance system is the upgrade successful mark information, the upgrade is started from the application system; and in the case that information read by the guidance system is upgrade failed mark information, the upgrade is started from the backup system; and therefore, the accuracy on upgrade of the firmware package is further ensured.

In still some other embodiments of the disclosure, the first update module is further configured to update, after determining the application system as the start-up system, the system variables to a system state of the application system. By updating the system variables to the system state of the application system, the preparation is made for the subsequent upgrade of the firmware package, thereby further ensuring the accuracy on upgrade of the firmware package.

In some embodiments of the disclosure, the first update module is further configured to update the system variables to a system state of the backup system. By updating the system variables to the system state of the backup system, the preparation is made for the subsequent upgrade of the firmware package, thereby further ensuring the accuracy on upgrade of the firmware package.

In some other embodiments of the disclosure, the backup system region is configured to store a system of a basic version. The system of the basic version is configured to ensure security work of the upgrade and the mobile carrier, and is generally a stable system subjected to long term test.

In still some other embodiments of the disclosure, the application system region is configured to store a system for upgrade. The application system includes a latest firmware package, and is generally configured for actual use.

In some other embodiments of the disclosure, the firmware package further includes CPU firmware, FPGA firmware, and an APP program, and the version information file includes version information of the CPU firmware, version information of the FPGA firmware and version information of the APP program. As shown in FIG. 3, after new functions are developed by the developers, the CPU firmware, the FPGA firmware, the APP program and the version information file storing the firmware are packaged into the firmware package, and the firmware package version is updated to the firmware package version file; the firmware package version file lists version numbers of firmware packages corresponding to transfer devices of hardware versions, such as Nbox2.0 and Nbox2.5; and then, both the firmware package and the firmware package version file are uploaded to a server. In use, the user or the automatic downloading system of the unmanned vehicle downloads each version of the firmware package of the transfer device to the vehicle-mounted storage device according to the firmware package version file; and when the mobile carrier system is started, the version information in the transfer device is compared according to the version information in the firmware package; if both are the same, the system is not upgraded; and if both are different, the system is upgraded. The mobile carrier includes but not limited to the unmanned vehicle.

The apparatus for upgrading the firmware of the transfer device on the mobile carrier includes a processor and a memory. The first determination unit, the second determination unit and the upgrade unit are all stored to the memory as program units. The processor executes the program units stored in the memory to implement corresponding functions.

The processor includes a kernel, which calls a corresponding program unit from the memory. There may be one or more kernels, and the remote upgrade on the firmware package of the transfer device in the mobile carrier is realized by adjusting kernel parameters.

The memory includes a volatile memory, a Random Access Memory (RAM) and/or a non-volatile memory in a computer-readable medium such as a Read-Only Memory (ROM) or a flash RAM, the memory including at least one storage chip.

The embodiments of the disclosure provide a non-transitory storage medium having a program stored thereon. When the program is executed by a processor, the method for upgrading the firmware of the transfer device on the mobile carrier is implemented.

The embodiments of the disclosure provide a processor, configured to run a program; and the program runs to execute the method for upgrading the firmware of the transfer device on the mobile carrier.

The embodiments of the disclosure provide a device, which includes a processor, a memory and a program stored on the memory and runnable on the processor. When executing the program, the processor at least implements the following steps:

In S101, according to present version information of a firmware package of the transfer device and a firmware package version file including update version information, whether the firmware package in the transfer device is able to be upgraded is determined, the transfer device is configured to transfer sensor data on the mobile carrier, and the transfer device is further configured to provide a network port for the mobile carrier.

In S102, in a case that it is determined that the transfer device is able to be upgraded, whether the update version information matches with the present version information is determined.

In S103, in a case that the update version information does not match with the present version information, the firmware package in the transfer device is upgraded.

The device herein may be a server, a Personal Computer (PC), a PAD, a mobile phone or the like.

The disclosure further provides a computer program product; and when executed on a data processing device, the computer program product is adapted to executing a program initializing at least the following method steps.

In S101, according to present version information of a firmware package of the transfer device and a firmware package version file including update version information, whether the firmware package in the transfer device is able to be upgraded is determined, the transfer device is configured to transfer sensor data on the mobile carrier, and the transfer device is further configured to provide a network port for the mobile carrier.

In S102, in a case that it is determined that the transfer device is able to be upgraded, whether the update version information matches with the present version information is determined.

In S103, in a case that the update version information does not match with the present version information, the firmware package in the transfer device is upgraded.

The person skilled in the art should understand that the embodiments of the disclosure may be provided as a method, a system or a computer program product. Thus, forms of complete hardware embodiments, complete software embodiments or embodiments integrating software and hardware may be adopted in the disclosure. Moreover, a form of the computer program product implemented on one or more computer available storage media (including, but not limited to, a disk memory, a Compact Disc ROM (CD-ROM), an optical memory and the like) containing, computer available program codes may be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

In a typical configuration, a calculation device includes one or more processors (CPUs), an input/output interface, a network interface and a memory.

The memory includes a volatile memory, a RAM and/or a non-volatile memory in a computer-readable medium such as a ROM or a flash RAM. The memory is an example of the computer-readable medium.

The computer-readable medium includes permanent and non-permanent media, and mobile and non-mobile media, which may implement information storage by any method or technology. The information may be a computer-readable instruction, a data structure, a program module or other data. The example of the computer non-transitory storage medium includes, but is not limited to, a Phase-change RAM (PRAM), a Static RAM (SRAM), a Dynamic RAM (DRAM), other types of RAMS, a ROM, an Electrically Erasable Programmable ROM (EEPROM), a flash memory or other memory technologies, a CD-ROM, a Digital Video Disk (DVD) or other optical memories, or a magnetic cassette tape. The magnetic cassette tape or other magnetic storage devices or any other non-transmission media may be used to store information accessible by the calculation device. According to the definition herein, the computer-readable medium does not include transitory media such as a modulated data signal and carrier.

It should also be noted that the terms "include", "contain" or any other variations thereof are intended to cover a non-exclusive inclusion, such that a process, method, article or equipment including a series of elements not only includes those elements, but also includes those elements that are not explicitly listed, or includes elements inherent to such a process, method, article or device. Under the condition of no more limitations, it is not excluded that additional identical elements exist in the process, method, article or device including elements defined by a sentence "including a . . . ".

Embodiment

Figure 4:
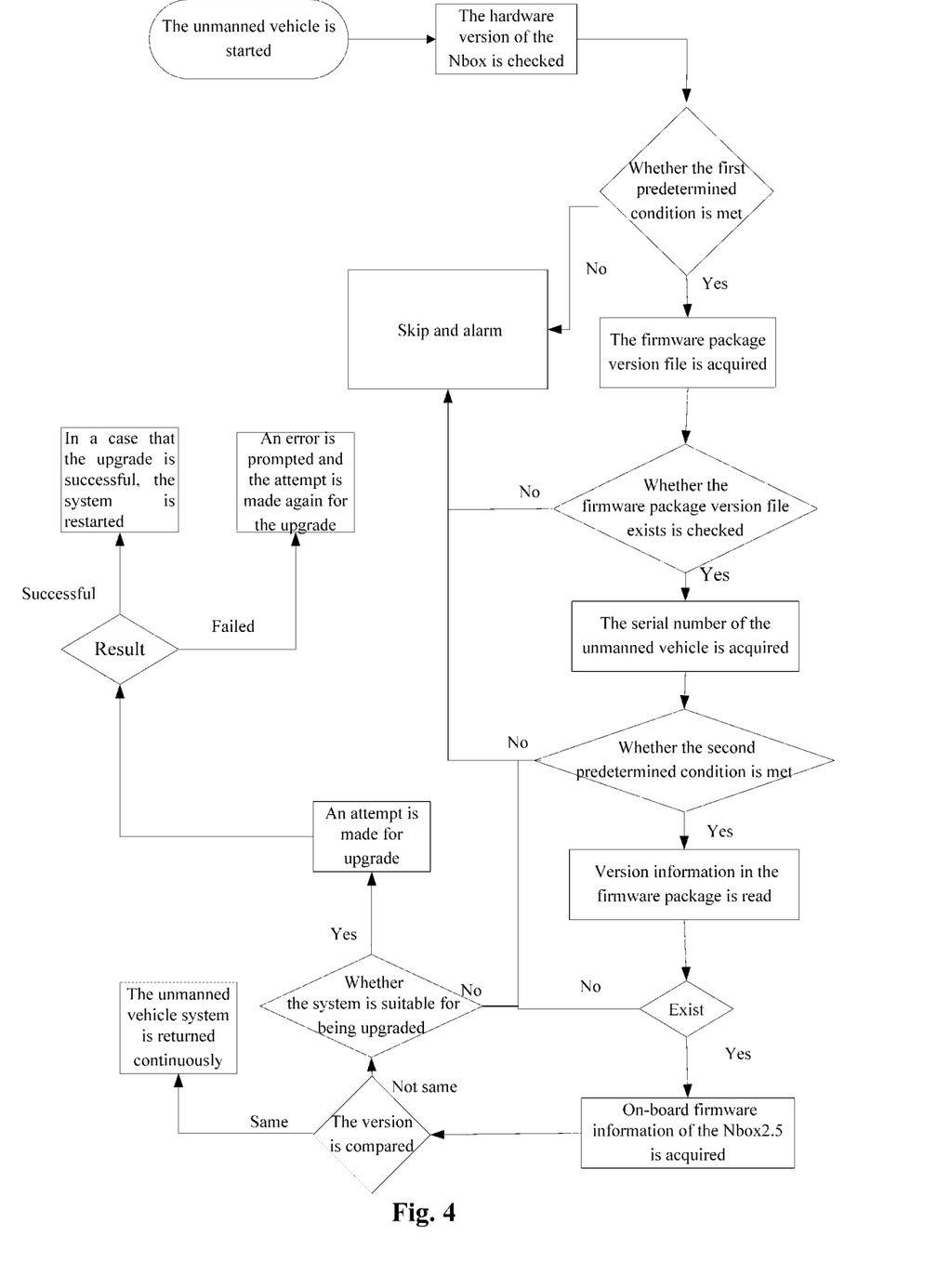
FIG. 4 illustrates a flowchart of a method for upgrading firmware of a specific transfer device according to some embodiments of the disclosure.

The embodiment relates to a flowchart of a method for upgrading firmware of a specific transfer device. As shown in FIG. 4, the mobile carrier is the unmanned vehicle, and the transfer device is the Nbox2.5. After the unmanned vehicle system is started, the hardware version of the Nbox is first checked. Since a majority of vehicle-mounted hardware of the unmanned vehicle have a very long life cycle, many hardware versions of each of the vehicle-mounted hardwares may be involved in the very long life cycle, the unmanned vehicle may have a variety of types and the hardware used by each type may be not consistent, which vehicle-mounted hardware version needs to be determined, and then whether the transfer device corresponding to the determined hardware version is able to be upgraded is determined, i.e., whether the present version information meets the first predetermined condition is determined. The first predetermined condition is to match with one piece of version information in the version information list, i.e., the same as the one piece of version information in the version information list. That is, In the embodiments, determining whether the present version information meets the first predetermined condition is to determine that the present version information matches with (same as) one piece of version information in the version information list; if both are the same, the first predetermined condition is met; and if both are not the same, the first predetermined condition is not met. In a case that the present version information meets the first predetermined condition, a firmware package version file is acquired; if the system cannot be upgraded, skip and alarm steps are executed; after the firmware package version file is acquired, whether the firmware package version file exists is checked; in a case that the firmware package version file exists, a serial number of the unmanned vehicle is acquired; in a case that the firmware package version file does not exist, the skip and alarm steps are executed; after the serial number of the unmanned vehicle is acquired, whether the system is able to be upgraded is determined continuously, i.e., whether the serial number of the unmanned vehicle meets a second predetermined condition is determined, i.e., whether a database has a serial number same as the serial number of the unmanned vehicle is determined; in a case that the second predetermined condition is met, version information in the firmware package is read; in a case that the system is not able to be upgraded, the skip and alarm steps are executed; after the version information in the firmware package is read, if the version information of the firmware package exists, on-board firmware information of the nbox2.5 (i.e., the version number of the corresponding device) is acquired, and then the version is compared; in a case that the on-board firmware information and the read version information in the firmware package are compared to be the same, the unmanned vehicle system is returned continuously; in a case that the on-board firmware information and the read version information in the firmware package are compared to be not the same, the unmanned vehicle system is returned continuously to determine whether the system is suitable for being upgraded; in a case that, the system is suitable for being upgraded, an attempt is made for upgrade, and then whether the upgrade is successful is determined; in a case that the upgrade is successful, the system is restarted; and in a case that the upgrade is failed, an error is prompted and the attempt is made again for the upgrade.

As can be seen from the above description, the above embodiments of the disclosure implement the following technical effects.

1) In the method for upgrading the firmware of the transfer device on the mobile carrier provided by the disclosure, according to the present version information of the firmware package of the transfer device and the firmware package version file including the update version information, whether the firmware package in the transfer device is able to be upgraded is determined; in the case that the transfer device is able to be upgraded, whether the update version information matches with the present version information is determined; and in the case that the update version information does not match with the present version information, the firmware package in the transfer device is upgraded. In the conventional art, as the transfer device cannot be upgraded remotely, and it is necessary to manually remove a rectification hood of the mobile carrier, open a cover of a transfer device case, and manually refresh and write a program, both time and labor are consumed, the firmware version may be refreshed falsely and the accuracy of the version cannot be ensured. The solutions provided by the disclosure can realize remote upgrade of the firmware package of the transfer device in the mobile carrier, thereby greatly reducing the workload and ensuring the accuracy of the version.

2) In the apparatus for upgrading the firmware of the transfer device on the mobile carrier provided by the disclosure, the first determination unit determines, according to the present version information of the firmware package of the transfer device and the firmware package version file including the update version information, whether the firmware package in the transfer device is able to be upgraded; in the case that the transfer device is able to be upgraded, the second determination unit determines whether the update version information matches with the present version information; and in the case that the update version information does not match with the present version information, the upgrade unit upgrades the firmware package in the transfer device. In the conventional art, as the transfer device cannot be upgraded remotely, and it is necessary to manually remove a rectification hood of the mobile carrier, open a cover of a transfer device case, and manually refresh and write a program, both time and labor are consumed, the firmware version may be refreshed falsely and the accuracy of the version cannot be ensured. The solutions provided by the disclosure can realize remote upgrade of the firmware package of the transfer device in the mobile carrier, thereby greatly reducing the workload and ensuring the accuracy of the version.

The above are only preferred embodiments of the disclosure and should not be used for limiting the disclosure. For the person skilled in the art, the disclosure may have various modifications and changes. Any modifications, equivalent replacements, improvements and the like within the spirit and principle of the disclosure shall fall within the scope of protection of the disclosure.

What is claimed:

1. A method for upgrading firmware of a transfer device on a mobile carrier, comprising:
   according to present version information of a firmware package of the transfer device and a firmware package version file comprising update version information, determining whether the firmware package in the transfer device is able to be upgraded, the transfer device being configured to transfer sensor data on the mobile carrier, and the transfer device being further configured to provide a network port for the mobile carrier;
   in a case of determining that the transfer device is able to be upgraded, determining whether the update version information matches with the present version information; and
   in a case that the update version information does not match with the present version information, upgrading the firmware package in the transfer device,
   wherein storage device of the transfer device comprises a guidance system region, a backup system region, an application system region, a version information region, an upgrade successful mark information region and an upgrade failed mark information region,
   upgrading the firmware package in the transfer device comprises:
   determining, by a guidance system in the guidance system region, a start-up system for upgrading the firmware package;
   starting upgrade of the firmware package according to the start-up system;
   updating system variables to a corresponding system state of the start-up system;
   determining whether each file for upgrading the firmware package exists; in a case that each file exists, checking a check value of each file;
   determining whether each file passes through check according to each check value; and
   in a case of determining that each file passes through the check, first erasing upgrade successful mark information in the upgrade successful mark information region, and then erasing data in the application system region and data in the version information region.

2. The method as claimed in claim 1, wherein according to the present version information of the firmware package of the transfer device and the firmware package version file comprising the update version information, determining whether the firmware package in the transfer device is able to be upgraded comprises:
  acquiring the present version information of the firmware package of the transfer device;
  determining whether the present version information meets a first predetermined condition;
  in a case of determining that the present version information meets the first predetermined condition, acquiring the firmware package version file comprising the update version information, the update version information being version information of an update firmware package, and the update firmware package being a firmware package which is obtained by updating the firmware package and to be applied in the transfer device;
  determining whether the update firmware package exist;
  in a case that the update firmware package and the firmware package version file exist, acquiring a serial number of the mobile carrier, the transfer device being mounted on the mobile carrier;
  determining whether the serial number of the mobile carrier meets a second predetermined condition; and
  in a case that the serial number of the mobile carrier meets the second predetermined condition, determining that the transfer device is able to be upgraded.

3. The method as claimed in claim 2, wherein determining whether the serial number of the mobile carrier meets the second predetermined condition comprises:
  determining whether a database has a serial number same as the serial number of the mobile carrier, the database being at least configured to store a serial number of each mobile carrier;
  in a case that the database has the serial number same as the serial number of the mobile carrier, determining that the serial number of the mobile carrier meets the second predetermined condition; and
  in a case that the serial number of the mobile carrier is not the same as the serial number in the database, determining that the serial number of the mobile carrier does not meet the second predetermined condition.

4. The method as claimed in claim 2, before acquiring the firmware package version file comprising the update version information, further comprising:
  acquiring the update firmware package, the update firmware package comprising updated firmware and a version information file corresponding to the updated firmware, and the version information file comprising the version information of the update firmware package;
  updating the version information of the update firmware package to an initial firmware package version file to obtain the firmware package version file comprising the update version information, the firmware package version file comprising firmware package version information corresponding to a plurality of the transfer devices, and the firmware package version information at least comprising a firmware version number; and
  storing the update firmware package and the updated firmware package version file to a storage device, the storage device being located on the mobile carrier.

5. The method as claimed in claim 1, wherein after in the case of determining that each file passes through the check, first erasing the upgrade successful mark information in the upgrade successful mark information region, and then erasing the data in the application system region and the data in the version information region, upgrading the firmware package in the transfer device further comprises:
  storing each file to the application system region;
  reading back each file stored to the application system region, and checking each file read and each file stored to the application system region;
  in a case that each file read and each file stored to the application system region pass through check, storing the version information to the version information region;
  reading back the version information stored to the version information region, and checking the version information; and
  in a case that the version information region pass through check, upgrading the upgrade successful mark information in the upgrade successful mark information region.

6. The method as claimed in claim 5, wherein the backup system region is configured to store a system of a basic version.

7. The method as claimed in claim 5, wherein the application system region is configured to store a system for upgrade.

8. The method as claimed in claim 1, wherein determining, by the guidance system in the guidance system region, the start-up system for upgrading the firmware package comprises:
  in a case that information read by the guidance system is the upgrade successful mark information, determining, by the guidance system, an application system as the start-up system, the application system being provided in the application system region; and
  in a case that information read by the guidance system is upgrade failed mark information, determining, by the guidance system, a backup system as the start-up system, the backup system being provided in the backup system region.

9. The method as claimed in claim 8, wherein after determining the application system as the start-up system, updating the system variables to the corresponding system state of the start-up system comprises:
  updating the system variables to a system state of the application system.

10. The method as claimed in claim 9, wherein the backup system region is configured to store a system of a basic version.

11. The method as claimed in claim 8, wherein after determining the backup system as the start-up system, updating the system variables to the corresponding system state of the start-up system comprises: updating the system variables to a system state of the backup system.

12. The method as claimed in claim 11, wherein the backup system region is configured to store a system of a basic version.

13. The method as claimed in claim 8, wherein the backup system region is configured to store a system of a basic version.

14. The method as claimed in claim 8, wherein the application system region is configured to store a system for upgrade.

15. The method as claimed in claim 1, wherein the backup system region is configured to store a system of a basic version.

16. The method as claimed in claim 1, wherein the application system region is configured to store a system for upgrade.

17. The method as claimed in claim 1, wherein the firmware package further comprises Central Processing Unit (CPU) firmware, Field Programmable Gate Array (FPGA) firmware, and an Application (APP) program, and the version information file comprises version information of the CPU firmware, version information of the FPGA firmware and version information of the APP program.

18. A non-transitory storage medium, comprising a stored program, wherein the program executes the method of claim 1.

* * * * *